US009856727B2

(12) United States Patent
Natali et al.

(10) Patent No.: US 9,856,727 B2
(45) Date of Patent: Jan. 2, 2018

(54) AUTOMATIC DOSING OF SURFACTANT FOR RECOVERED HYDROCARBON ENHANCEMENT

(71) Applicant: Halliburton Energy Services, Inc., Houston, TX (US)

(72) Inventors: Sanja Natali, Houston, TX (US); Jason D. Dykstra, Spring, TX (US); Yuzhen Xue, Humble, TX (US); Zhijie Sun, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 170 days.

(21) Appl. No.: 14/889,039

(22) PCT Filed: Dec. 31, 2014

(86) PCT No.: PCT/US2014/072927
§ 371 (c)(1),
(2) Date: Nov. 4, 2015

(87) PCT Pub. No.: WO2016/108867
PCT Pub. Date: Jul. 7, 2016

(65) Prior Publication Data
US 2016/0356142 A1    Dec. 8, 2016

(51) Int. Cl.
*E21B 43/34* (2006.01)
*E21B 49/08* (2006.01)
(Continued)

(52) U.S. Cl.
CPC .............. *E21B 43/34* (2013.01); *C09K 8/52* (2013.01); *C09K 8/584* (2013.01); *C10G 33/04* (2013.01);
(Continued)

(58) Field of Classification Search
CPC ........ E21B 43/34; E21B 47/10; E21B 49/086; E21B 47/00; E21B 49/08; E21B 49/088; E21B 2049/085; E21B 21/068
See application file for complete search history.

(56) References Cited

U.S. PATENT DOCUMENTS 8,357,639 B2   1/2013  Quintero et al.
8,822,385 B2   9/2014  Quintero et al.
(Continued)

FOREIGN PATENT DOCUMENTS

WO   2010007390 A2   1/2010
WO   2013053036 A1   4/2013

OTHER PUBLICATIONS

AbbottApps Production, Measure EACN, http://www.stevenabbott.co.uk/PracticalSurfactants/MeasureEACN.html, Dec. 10, 2014.
(Continued)

*Primary Examiner* — Zakiya W Bates
(74) *Attorney, Agent, or Firm* — McDermott Will & Emery LLP (57) ABSTRACT

Systems comprising a main tubular coupled to a pump and extending from a surface into a subterranean formation, wherein produced bulk fluid is pumped to the surface, and wherein the bulk fluid comprises at least water and a hydrocarbon, and has certain constituent parameters; a storage container for retaining the bulk fluid; a sampling tubular in fluid communication with the main tubular for sampling the bulk fluid, thereby forming at least one sampled fluid; and a dosing system coupled to the sampling tubular and configured to receive the sampled fluid, the dosing system configured to determine a constituent parameter of the sampled fluid, identify a type and concentration of separating surfactant to include in the bulk fluid to obtain a hydrophilic-lipophilic deviation (HLD) substantially equal to 0, and introduce the identified type and concentration of the separating surfactant into the storage container retaining the bulk fluid.

22 Claims, 3 Drawing Sheets

(51) Int. Cl.
*C09K 8/52* (2006.01)
*C09K 8/584* (2006.01)
*E21B 21/06* (2006.01)
*C10G 33/04* (2006.01)

(52) U.S. Cl.
CPC .......... *E21B 21/068* (2013.01); *E21B 49/086* (2013.01); *C10G 2300/1033* (2013.01); *C10G 2300/201* (2013.01); *C10G 2300/4037* (2013.01)

(56) References Cited

U.S. PATENT DOCUMENTS

| | | |
|---|---|---|
| 2013/0020085 A1 | 1/2013 | Pone et al. |
| 2013/0067999 A1 | 3/2013 | Xu et al. |
| 2013/0096036 A1 | 4/2013 | Quintero et al. |
| 2013/0104772 A1 | 5/2013 | Schabron et al. |
| 2014/0332212 A1 | 11/2014 | Ayers et al. |

OTHER PUBLICATIONS

AbbottApps Production, Measurements, http://www.stevenabbott.co.uk/PracticalSurfactants/Measurements.html, Dec. 10, 2014.
International Search Report and Written Opinion for PCT/US2014/072927 dated Sep. 30, 2015.

AUTOMATIC DOSING OF SURFACTANT FOR RECOVERED HYDROCARBON ENHANCEMENT

BACKGROUND

The present disclosure generally relates to subterranean formation operations and, more particularly, the automatic dosing of surfactant for recovered hydrocarbon enhancement.

The production of underground hydrocarbons often requires substantial investment in drilling and pumping equipment. When production is underway, up-front costs can be recouped provided that operating costs remain low enough for the sale of oil and/or gas to be profitable. During the production of hydrocarbons, relatively large quantities of water may be produced along with the hydrocarbons (also referred to herein simply as "oil"). In some formations, water and other by-products can amount to as much as eighty to ninety percent of the total production yield. The presence of water commingled with produced oil is a significant factor affecting the cost of many subterranean formation operations. Many profitable formations may become uneconomic because of excessive water production. Costs involved with pumping, separating, collecting, treating and/or disposing of water often have a devastating impact on profit margins, particularly for older wells with declining hydrocarbon production.

Separating the oil from the water in a produced fluid enables operators to recover pure or substantially pure oil and/or reuse, recondition, or otherwise process the water. Such separation may allow an operator to reduce transportation and disposal costs, to maintain the separated water in the formation or at the surface at a well site (e.g., at an offshore location), and the like. In some instances, produced water separated from produced oil may be suitable for agriculture, livestock, and/or wildlife use, potentially creating a means of beneficially recycling the separated water and/or a revenue stream.

Various methods have been employed for separating water from produced oil. For example, oil and water are typically pumped or otherwise flowed together to the surface where they are treated by heat to separate the oil from the water. The heat separates the denser water from the less-dense oil. In other instances, the oil and water may be separated using hydroclones, which spin the produced fluid (e.g., the oil and water mixture returned from the subterranean formation) and use acceleration to separate the oil and water. These separation techniques may also be used in combination with downhole equipment (e.g., submersible pumps) to achieve separation of oil and water produced by a formation at a downhole location.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure generally relates to subterranean formation operations and, more particularly, the automatic dosing of surfactant compositions (also referred to herein simply as "surfactant") for recovered hydrocarbon enhancement. More specifically, the systems and methods of the present disclosure employ an automatic dosing system ("ADS") for determination of a surfactant type and amount based on the hydrophilic-lipophilic deviation model to include in produced fluid to achieve separation of oil and water. The ADS is dynamic and adaptable in real-time or substantially real-time to separate oil and water produced from a subterranean formation, although such real-time use is not required. As used herein, the term "subterranean formation," or simply "formation," refers to any material under the surface of the earth, encompassing both areas below exposed earth and areas below earth covered by water (e.g., ocean water or fresh water). A wellbore may be any opening in a subterranean formation, such as an opening for recovering produced hydrocarbons, as comingled water. As used herein, the term "substantially" means largely, but not necessarily wholly.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques. As used herein, the term "about" with reference to numerical quantities may mean±5% of a stated numerical value, encompassing any value and subset therebetween.

One or more illustrative embodiments are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

The ADS of the present disclosure, as discussed above, utilizes the hydrophilic-lipophilic deviation ("HLD") model to achieve fluid separation of oil and water produced from a formation. The HLD model quantifies the relative impact of the hydrophilic-lipophilic nature of oils and surfactants on the morphological phase behavior a fluid comprising oil, water, and surfactant. Because produced fluids comprise oil and water naturally, the ADS is used to determine the amount and type of surfactant to include therein to achieve the desired morphological phase.

Figure 1:
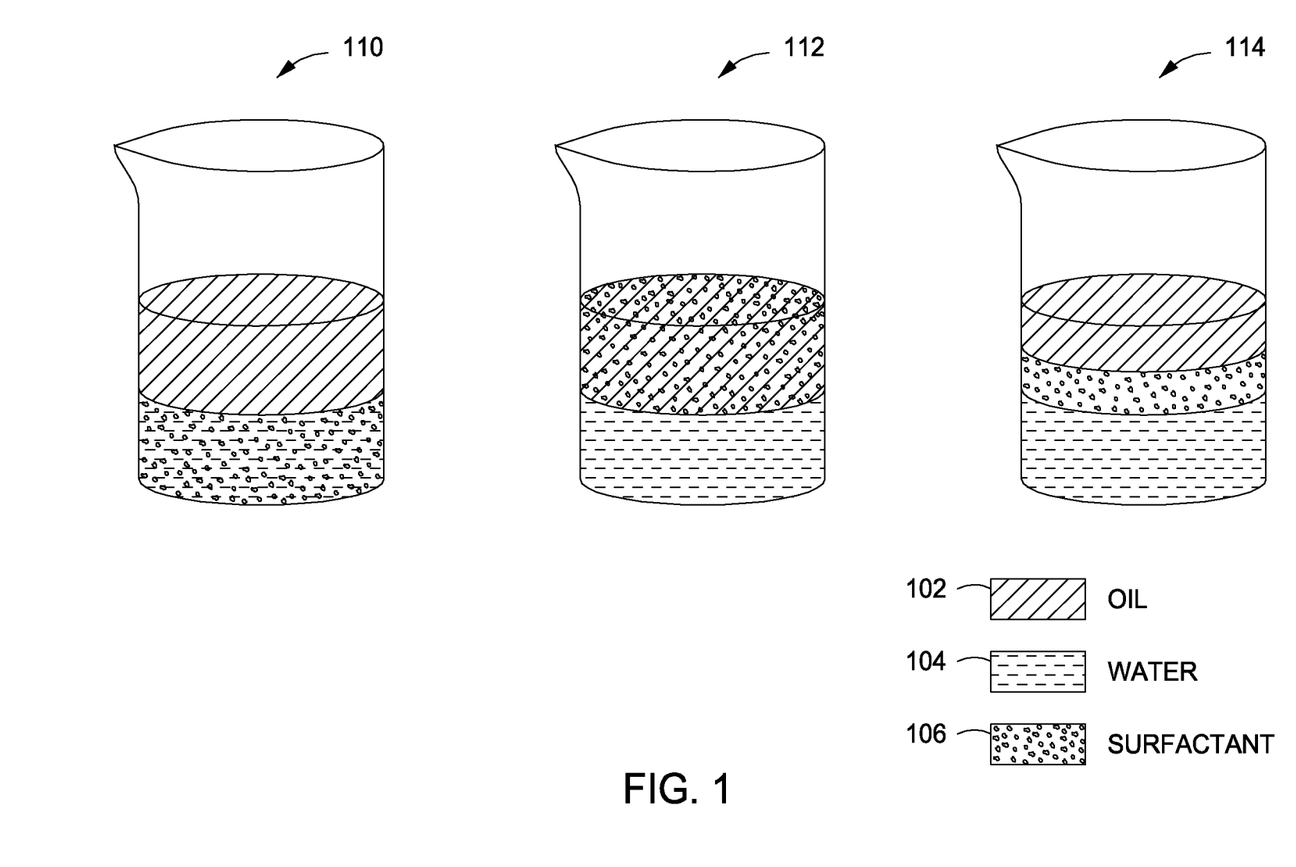
FIG. 1 provides an illustration of the morphological phases of an oil-water system with added surfactant.

As shown in FIG. 1, three (3) morphological phases may exist when a surfactant 106 is added to a fluid comprising commingled oil 102 and water 104 (an "oil-water fluid"), each associated with a relative HLD value, discussed in detail below. As used herein, the term "oil-water-surfactant system," (or "O/W/S system"), may be used to describe an oil-water system having a surfactant added therein. The morphological phases include an oil-in-water morphological phase 110, a water-in-oil morphological phase 112, and an oil-water separation morphological phase 114. The oil-in-water morphological phase 110, also referred to as a "Winsor Type I" emulsion (including micro- and nano-emulsions) is characterized by an water 104 and surfactant 106 emulsion, leaving an excess oil 102 phase. The water-in-oil morphological phase 112, also referred to as a "Winsor Type II" emulsion (including micro- and nano-emulsions) is characterized by an oil 102 and surfactant 106 emulsion, leaving an excess water 104 phase. Finally, the oil-water separation morphological phase 114, also referred to as a "Winsor Type III" emulsion, is characterized by a three-phase separation (also referred to as "oil-water separation morphological phase") in which the surfactant 106 is located at the face between the oil 102 and water 104. It will be appreciated by one of skill in the art that some intermixing between the surfactant 106, the oil 102, and the water 104 occurs at each morphological phase type. For example, in the oil-water separation morphological phase, some intermixing between the surfactant 106 and the oil 102 and water 104 may occur at the face therebetween.

To achieve optimal separation of the water 104 from the oil 102 in an oil-water system by including a surfactant therein, accordingly, the desired morphological phase is the oil-water separation morphological phase 114. In such a phase, the oil 102, the water 104, and the surfactant 106 may be easily separated by relatively simple means, such as by classical separation methods. Other physical separation methods may also be employed, without departing from the scope of the present disclosure. Achieving the oil-water separation morphological phase 114 may be dependent on the type and amount of surfactant selected, the type of oil in the oil-water system, the salinity of the water 104 in the oil-water system, the temperature of the in the O/W/S system, and the like, as described in detail below.

In traditional applications, inclusion of a surfactant 106 into an oil-water system to achieve the oil-water separation morphological phase 114 is performed by dosing of the surfactant 106 into the oil-water system by manual means in a laboratory setting, which is largely a trial-and-error analysis that is both time consuming, reagent consuming (e.g., of surfactants, other testing chemicals, and the like), and expensive. Such traditional applications are further suboptimal due to differences in the laboratory setting and the field, which may have varying fluid properties depending on time, temperature, location in a formation, and the like. The ADS of the present disclosure, however, may be performed in real-time or substantially real-time, while increasing the efficiency and accuracy of separating produced oil and water. In particular, the ADS automatically determines the ingredients, or elements, of a produced fluid flow (i.e., fluid produced from a formation including oil and water) that are critical to the HLD model, and determines a surfactant type and dosage to be included therein to separate the oil and water in the fluid. The ADS additionally employs a variety of embedded automations to ensure that separation of the oil and water is achieved, as discussed in detail below.

The HLD model is used in the ADS described in the present disclosure as a formulating tool. The HLD of an O/W/S system is dependent on the type and amount of surfactant used to form the desired oil-water separation morphological phase 114 (FIG. 1). For ionic surfactants, the HLD may be calculated using Equation 1, below; for nonionic surfactants, the HLD may be calculated using Equation 2, below:

$$HLD=\ln(S)-k^*EACN+c_c-\alpha_T(T-25°\ C.)+f(A) \quad \text{Equation 1}$$

$$HLD=b(S)-k^*EACN+c_{cn}-c_T(T-25°\ C.)+f(A) \quad \text{Equation 2,}$$

where S is the salinity of the water of the an O/W/S system (g/100 mL water), with log dependency in Equation 1; b is a salinity constant equivalent for nonionic surfactants (unitless); EACN is the equivalent alkane carbon number for the oil of the O/W/S system (unitless), which reflects the oil hydrophobicity based on the number of carbons in the oil or the equivalent number of carbons; T is temperature (° C.) of the O/W/S system at the point where the surfactant is to be added to the oil-water system; $f(A)$ is a function of alcohol (or co-solvent) type and concentration in the O/W/S system (unitless); k is a surfactant constant, which depends on the type of surfactant head group (unitless); $c_c$ is the characteristic curvature (i.e., surfactant hydrophilic-lipophilic nature) for an ionic surfactant (unitless); $c_{cn}$ is the characteristic curvature (i.e., surfactant hydrophilic-lipophilic nature) for a nonionic surfactant (unitless), which reflects the nonionic surfactant hydrophobicity; $\alpha_T$ is a surfactant temperature constant for ionic surfactants (1/° C.), which reflects the ionic surfactant hydrophobicity; and $c_T$ is a surfactant temperature constant for nonionic surfactants (1/° C.). Each of b, k, $\alpha_T$, and $c_T$ are constants of fixed value depending on the particular type of surfactant Accordingly, the HLD model takes into consideration salinity, temperature, alcohol content, and characteristics of the hydrophobicity and type of oil and surfactant (i.e., "HLD parameters"). In practice applications, produced oil-water systems (i.e., produced fluid from a subterranean formation comprising oil and water) typically do not include an alcohol content. Accordingly, the method of the present disclosure may use the HLD model based on Equation 3, pertaining to ionic surfactants, and Equation 4, pertaining to nonionic surfactants, below:

$$HLD=\ln(S)-k^*EACN+c_c-\alpha_T(T-25°\ C.) \quad \text{Equation 3}$$

$$HLD=b(S)-k^*EACN+c_{cn}-c_T(T-25°\ C.) \quad \text{Equation 4.}$$

Based on Equation 3 and Equation 4, as salinity, S, increases, the HLD value also increases. As the EACN value increases the HLD decreases. The surfactant temperature constants may be positive or negative. Accordingly, for example, the ionic surfactant temperature constant may be about 0.01, such that as the temperature, T, increases above the reference value of 25° C., the HLD decreases. On the other hand, for example, the nonionic surfactant temperature constant of an ethoxylate surfactant may be about −0.06, such that as the temperature, T, increases above the reference value of 25° C., the HLD increases. Additionally, as the characteristic curvature of the ionic surfactant, $c_c$, or the nonionic surfactant, $c_{cn}$, increases, the HLD also increases.

The HLD value produced by Equation 3 or Equation 4, depending on the type of surfactant used, predicts the morphological phase of a water-oil system. Referring again to FIG. 1, when the HLD value is equal to zero (0), the oil-water separation morphological phase 114 is achieved and represents optimal separation of the oil 102 and water 104 phases. As the HLD decreases to values less than zero (0), a water-oil system comprising a surfactant will adopt the oil-in-water morphological phase 110; whereas as the HLD increases to values greater than zero (0), the water-oil system comprising a surfactant will adopt the water-in-oil morphological phase 112. Thus, to achieve the desired oil-water separation morphological phase 114, the HLD should be equal to zero (0) or substantially equal to zero (0). Accordingly, although in some embodiments HLD may ideally=0, in other embodiments, the HLD may still be acceptable where the HLD ranges from +/−1, preferably +/−0.5, more preferably +/−0.3, encompassing any value and subset therebetween. By way of example a system of water, SDHS (sodium dihexylsulfosuccinate), and toluene may be considered acceptable if the system achieves an HLD of from −0.2 to 0.3.

Below, examples of determining HLD according to the present disclosure are provided with reference to first determining an unknown EACN value for a specific type of oil. However, it will be appreciated that these examples are not limiting, and any parameter, and in any combination, in the HLD model may be used to determine the type and amount of surfactant(s) necessary to achieve the oil-water separation morphological phase 114 previously discussed. That is, any one, more than one, or all of the salinity, temperature, characteristics of the hydrophobicity and type of oil and surfactant, and the alcohol content where applicable may be used to determine the type and amount of surfactant(s) necessary to achieve the oil-water separation morphological phase 114, without departing from the scope of the present disclosure. Moreover, the methods described with reference to the determining the EACN value (e.g., adding known surfactant, adding known salt, adding known oil, and the like) may be employed to determine any other HLD parameter in the HLD model, without departing from the scope of the present disclosure.

The EACN value is specific for each type of oil, and explains the hydrophobicity of the oil. The EACN for alkane oils may be equivalent to the number of carbons atoms in the oil molecule. However, for other oil types, the number of carbon atoms alone may not predict the EACN of the oil, or the oil's hydrophobicity. The EACN of an oil may be determined experimentally where the HLD value=0, representing an oil-water separation morphological phase 114 (FIG. 1) by using known values for the remaining variables in either Equation 1 or Equation 2. The temperature variable, T, may be controlled at temperature 25° C., such that the variable is effectively no longer taken into account in determining the EACN value. This is particularly so because the testing in the ADS is performed at ambient temperatures (e.g., 25° C.) Similarly, the salinity, S, may be effectively removed as a variable for determining HLD by using a known salinity and measuring the salinity using known techniques (e.g., a conductivity meter, a refractometer, a hydrometer, and the like).

In one instance, the EACN may be determined by using at least two known surfactants having a characteristic curvature and a known salinity based on the relative combination of the known surfactants ("surfactant-surfactant method"). In some instances, use of a two or more of known ionic surfactants in varying concentrations and proportions to one another may cover a wider range of curvature values, which may be preferred to experimentally determining the EACN of a particular O/W/S system. The selected known surfactants should preferably not include surfactants that form complex phases between each other, should preferably be relatively compatible with oil-water systems generally produced from formations, and the like. The characteristic curvature of a mixture of surfactants is determined based on a linear relationship of the added surfactant types, based on Equation 5 for ionic surfactants, and Equation 6 for nonionic surfactants, as follows:

$$C_{c\text{-}mix} = \Sigma_i y_i C_{c_i} \qquad \text{Equation 5,}$$

$$C_{cn\text{-}mix} = \Sigma_i y_i C_{cn_i} \qquad \text{Equation 6,}$$

where $y_i$ is the fraction of the $i^{th}$ surfactant component (unitless) (e.g., 0.25 if that surfactant component makes up 25% of the surfactant composition); $C_{c_i}$ is the characteristic curvature of the $i^{th}$ ionic surfactant component; and $C_{cn_i}$ is the characteristic curvature of the $i^{th}$ nonionic surfactant component.

In another instance, the EACN may be determined using at least one known surfactant (e.g., known characteristic curvature) and at least one known oil component (e.g., known EACN), to be included in the O/W/S system in addition to the already present oil component ("surfactant-oil method"), each in varying concentrations and proportions to one another. The ratios of the different oils may be adjusted until the HLD value=0, and the EACN of the known and unknown oil mixture is elucidated. Thereafter, the EACN of the unknown oil may be calculated. The EACN value of a mixture of oils is determined based on a linear relationship of the added oil types, based on Equation 7, as follows:

$$EACN_{mix} = \Sigma_i x_i EACN_i \qquad \text{Equation 7,}$$

where $x_i$ is the fraction of the $i^{th}$ oil component (e.g., the unknown oil component) (unitless); and $EACN_i$ is the EACN of the $i^{th}$ oil component (e.g., the unknown oil component).

The EACN of an unknown oil in an O/W/S system may additionally be determined using the HLD model described herein using a known surfactant (e.g., known characteristic curvature) and a known range of salinities (e.g., range of salinity concentrations), S, such as by adding a salt to the O/W/S system or by diluting the O/W/S system with water ("salinity method"). Use of an ionic surfactant, in such instances, may permit a greater range of salinities to be evaluated, but it may be necessary to also take into account the salinity of the ionic surfactant itself. In some embodiments, it may be preferred to select a surfactant that can withstand very high salinities to more accurately determine the EACN of the unknown oil.

In each of the above methods, the surfactant-surfactant method, the surfactant-oil method, and the salinity method, a variety of concentrations and/or types of the known constituent parameters are included in a series of identical O/W/S systems, so as to enhance the ability to accurately determine the EACN of the particular system. That is, an O/W/S/system may be aliquoted by any means suitable into two or more testing tubes and the parameters are varied until the formation of an oil-water separation morphological phase 114 (FIG. 1) occurs in at least one of the testing tubes.

Once the EACN of an unknown oil in an O/W/S system is known, other unknown parameters may be calculated based on the known parameters and known EACN, thereby enabling determination of the surfactant characteristics detailed in the HLD model for achieving HLD=0 (or substantially 0). As previously discussed, determination of one or more other unknown parameters may be utilized based on the methods described herein, without departing from the scope of the present disclosure. Accordingly, with the known surfactant qualities required, a surfactant and dosage of the surfactant may be selected to achieve oil-water separation morphological phase distribution 114 (FIG. 1) of the oil-water system originally tested. Moreover, a combination of surfactants may also be employed. Such surfactants may be commercially available, laboratory made, or a mixture of one or both to achieve the desired qualities to achieve HLD=0 (or substantially 0). Additionally, the type of surfactant(s), dosage, and the like to achieve the oil-water morphological phase distribution 114 may be optimized based on cost, availability, environmental concerns, efficiency, and the like, without departing from the scope of the present disclosure.

Figure 2:
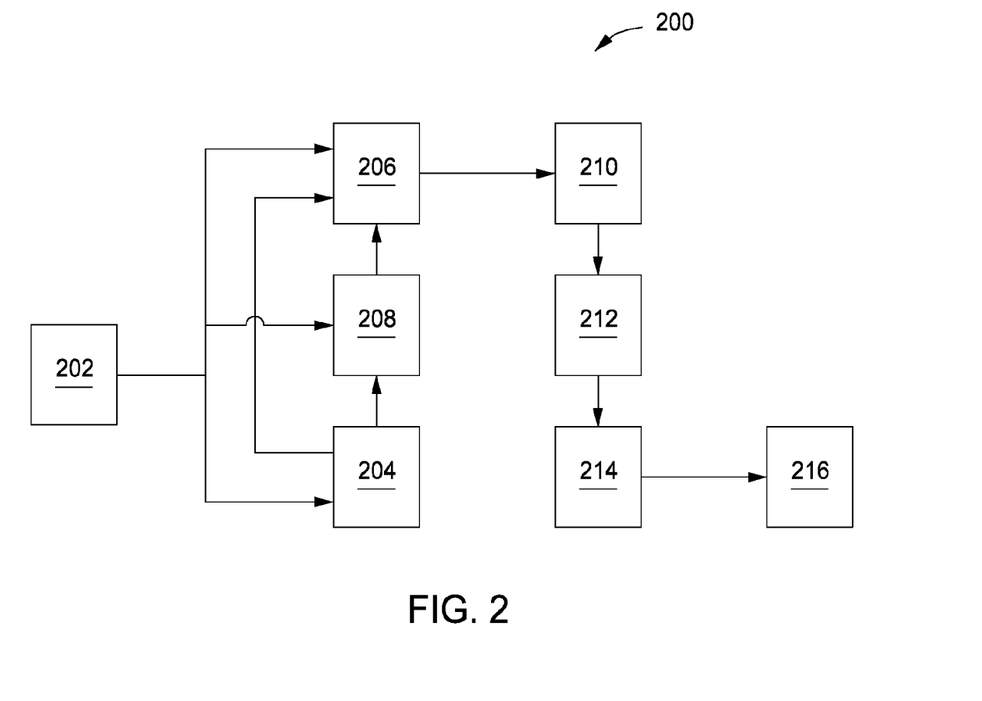
FIG. 2 provides an illustration of a flow process for an automatic dosing system, according to one or more embodiments of the present disclosure.

Referring now to FIG. 2, provides an illustration of a flow process for an automatic dosing system (ADS) 200, according to one or more embodiments of the present disclosure where each process step may be referred to as a "block." The term "block" corresponds to a process and does not necessarily mean a physical chamber or space separate from other blocks in the ADS, although such may be contemplated, without departing from the scope of the present disclosure. A produced formation fluid 102 sample (produced fluid 202) is collected from a well site as the fluid is produced from the subterranean formation in real-time or substantially real-time, as depicted and explained in detail below with reference to FIG. 3. For example, the produced fluid 202 may be collected using a bypass tubular from the main produced flow line tubular. The produced fluid 202 may then be analyzed using the ADS 200, according to the depicted arrows.

The produced fluid 202 may be collected as a single bulk sample, or iteratively in order to account for variations in the produced fluid that may occur over time, over the length of the wellbore in the formation from which it is collected, and the like. Moreover, the produced fluid 202 may be collected in series or parallel, such that multiple individual samples are representative of a single bulk produced fluid 202 (e.g., as though an aliquot was made from a single sample). For example, in some embodiments, a produced fluid 202 sample may be taken at time intervals ranging from a lower limit of about 30 seconds to an upper limit of about 5 hours, encompassing every value and subset therebetween. Each of the single, iteratively, or series collected produced fluid 202 samples may generally be of a volume sufficient to allow testing and observation using the ADS to evaluate HLD and achieve oil-water separation morphological phase distribution of the produced fluid from which the one or more produced fluid 202 samples. In some embodiments, the single, iteratively, or series collected produced fluid 202 samples may generally range in any volume suitable for use in the ADS described herein (e.g., based on equipment footprint availability), without departing from the scope of the present disclosure.

As part of the ADS, all or a portion of the produced fluid 202 may be directed to either a holding block 204, an observation block 206, or a parameter identification block 208. For simplicity, as used herein, unless otherwise indicated, the term "produced fluid 202" (or "produced fluid 202 sample") refers to both the entire collected sample or any portion thereof. Each of the holding block 204, the observation block 206, and the parameter identification block 208 may be, in some embodiments, separate physical chambers, or may be within the same physical space but simply follow the process steps described herein. In some embodiments, the produced fluid 202 may be aliquoted and distributed to one or all of the holding block 204, the observation block 206, and/or the parameter identification block 208. In other embodiments, the entirety of the produced fluid 202 (i.e., non-aliquoted) may got to one of the holding block 204, the observation block 206, or the parameter identification block 208.

The holding block 204 may simply be a location (separate or otherwise) to store one or more produced fluid 202 samples for later use in the observation block 206 or the parameter identification block 208. For example, the produced fluid 202 sample's morphological phase may be initially observed without testing and analysis. In other embodiments, the holding block 204 may hold a produced fluid 202 sample until it may be directed to the parameter identification block 208 for analysis and later observation in the observation block 206, as described herein. For example, the holding block 204 may be used when other produced fluid samples are currently undergoing analysis (e.g., held in queue).

The parameter identification block 208 provides an automatic experimental means of determining the characteristics of the produced fluid 202 sample, based on the HLD model described herein. In some embodiments, the characteristics of the produced fluid 202 sample that are determined in the parameter identification block 208 based on the HLD model described herein may include the EACN of the oil in the produced fluid 202 sample; the salinity, S, of the produced fluid 202 sample; and the characteristic curvature, $c_c$ or $c_{cn}$, surfactant in the produced fluid 202 sample (e.g., as a result of introducing surfactants into the formation during one or more subterranean formation operations). In some embodiments, in employing the methods described herein, the surfactant in the produced fluid 202 may be assumed to share the same constants as any added surfactant when using the HLD model to achieve the oil-water separation morphological phase. As described above, the EACN may first be determined experimentally, and then the remaining unknown factors may be calculated using the HLD model, or in the opposite order, without departing from the scope of the present disclosure. Also, as previously described, any other HLD parameter may be first experimentally determined, or any combination of HLD parameters may be first experimentally determined simultaneously, without departing from the scope of the present disclosure. In some embodiments, as described below, the water content of the produced fluid 202 sample may also be determined using the methods described herein.

Within the parameter identification block 208, one or more of the methods described above may be automatically employed to determine the unknown parameters of the produced fluid 202 sample using the HLD model. In some embodiments, for example, the EACN of a single produced fluid 202 sample may be tested using one of the surfactant-surfactant method, the surfactant-oil method, or the salinity method. The testing may be achieved by automatically aliquoting the produced fluid 202 sample into two or more testing tubes (e.g., by using an automatic pipette and testing tube wheel), and adding a fluid or component (e.g., salt) having known HLD parameters, as described above for each of the surfactant-surfactant method, the surfactant-oil method, and the salinity method. In some embodiments, the amount of testing tubes may be increased to increase the accuracy of the experimentally determined HLD parameters (e.g., EACN). The number of testing tubes, each having a different concentration, proportion, or type of parameters based on the HLD model and the methods described herein for determining the unknown parameters of the produced fluid 202 sample is not limiting. In some embodiments, the amount of testing tubes for any single HLD testing method may range from a lower limit of about 5 to an upper limit of about 20, encompassing any value and subset therebetween, or even higher, without departing from the scope of the present disclosure.

As described in detail below with reference to the observation block 206, the morphological phase separation of each of the produced fluid 202 samples analyzed using ADS described herein may be, in some embodiments, visually inspected as part of the ADS. Accordingly, the testing tubes may be made of a material that is substantially transparent to allow visual inspection by any means, including photography (e.g., a still camera), video photography (e.g., a video camera), a camera-imaging processing combination (e.g., a still or video camera captured and imaged), and the like. In other embodiments, conductivity testing may be performed to determine the transition between morphological phases and the material of the testing tube need not be transparent. These observation techniques may be automated and may be present in any combination in the observation block 206.

Figure 3:
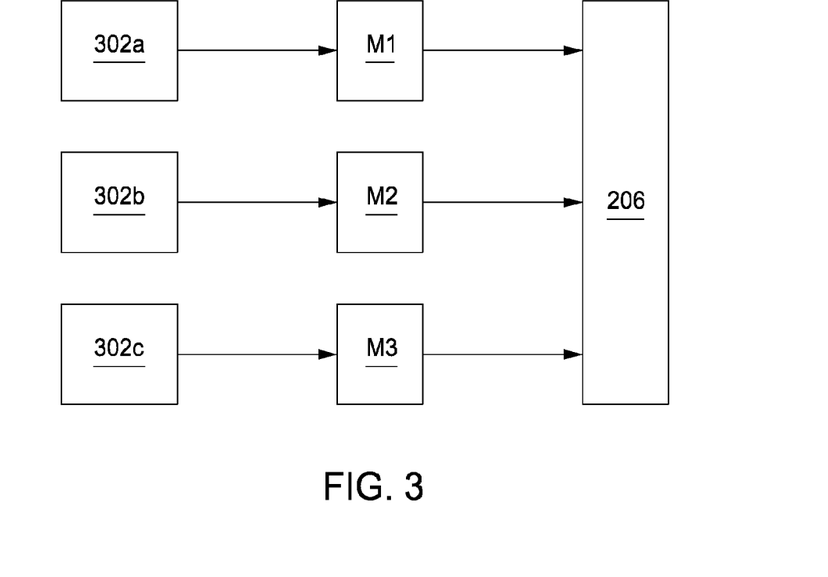
FIG. 3 provides an illustration of a flow process for a parameter identification block for use in an automatic dosing system, according to one or more embodiments of the present disclosure.

Referring now to FIG. 3, illustrated is a flow diagram of a parameter identification block 208 (FIG. 2) that may be used according to one or more embodiments of the present disclosure. As shown, a series of samples of produced fluid 302a, 302b, and 302c may be collected in series and represent a single bulk produced fluid sample (not shown) (e.g., multiple separate collections that are representative of the same produced fluid sample) or by aliquoting a large bulk batch sample of a single produced fluid sample (not shown), thereby representing a series of samples. The HLD parameters (e.g., EACN) of each of produced fluid 302a,b,c samples may then be determined using a variety of methods employing adding one or more known HLD parameters based on the HLD model, as described above. The HLD parameters of each of produced fluid 302a,b,c samples may be combined and averaged to increase the accuracy of the bulk produced fluid sample composition (e.g., EACN, salinity, and the like). As shown, three different methods of determining HLD parameters of produced fluid 302a,b,c samples may be used in the parameter identification block 208 of the present disclosure. As depicted, produced fluid 302a sample may be evaluated using the surfactant-surfactant method M1, where at least two known surfactants are varied in concentration and type in a desired number of separate testing tubes. The produced fluid 302b samples may be evaluated using the surfactant-oil method M2, where at least one surfactant and at least one oil are varied in concentration and type in a desired number of separate testing tubes. Finally, the produced fluid 302c sample may be evaluated using the salinity method M3, where the salinity of the produced fluid 302c sample is varied in concentration and type in a desired number of separate testing tubes.

Although FIG. 3 depicts only three produced fluid 302a,b,c sample series, representing a bulk produced sample, it will be appreciated that any number of series samples may be included in the embodiments of the present disclosure, without departing from the scope of the present disclosure. Moreover, each of the produced fluid 302a,b,c (or additional) samples need not be analyzed based on different methods (e.g., the surfactant-surfactant method, the surfactant-oil method, or salinity method). Rather, multiple series samples may be tested using the same method with different concentrations of known parameters varied, or different types of known parameters varied, or any combination thereof. Further, different methods may be employed, without departing from the scope of the present disclosure. As shown in FIG. 3, with reference to FIG. 2, each of the series of samples may be visually observed using the observation block 206 of the ADS. The data from the HLD model corresponding to the parameters of the produced fluid 302a,b,c for each testing tube identified in the observation block 206 to exhibit oil-water separation morphological phase distribution may then be input into a surfactant-dosage design block 210 (FIG. 2), which may automatically calculate one or more surfactant type(s) and dosage(s) for implementation in the bulk produced fluid from the formation. The observation block 206 and the surfactant-dosage design block 210 are discussed in greater detail below with reference to FIG. 2.

Referring back to FIG. 2, the parameter identification block 208 may be equipped with a mechanical shaker, or other shaker type, to agitate the testing tubes comprising produced fluid 302 samples and the components added for testing based on the HLD model, as described herein. The shaker may be used to ensure that the various added components (e.g., concentrations and proportions of known components to determine HLD parameters) in the testing tubes, which may thereafter be allowed to settle to determine whether an oil-water separation morphological phase distribution is achieved in any one or more of the testing tubes. Other agitation means may also be used in accordance with the present disclosure including, but not limited to, serial dosing of known components to one or more produce fluid 302 samples in the testing tubes, extremum seeking techniques, and the like.

The testing tubes that have settled are observed in the observation block 206, which may be a separate physical chamber that the testing tubes are transferred to, may be a separate physical chamber equipped with an observation window to allow visual inspection of the testing tubes, or may be a separate operation occurring in the same physical space as the processes described with reference to the parameter identification block 208. For example, the observation block 206 may be a conductivity monitor that automatically measures the conductivity of one or more testing tubes in the same location that they were agitated, without departing from the scope of the present disclosure. The oil-water separation morphological phase distribution phase, and in turn the HLD, may be reflected in a generated conductivity curve, where the HLD approaching zero (0) corresponds to a change of conductivity from a finite value to zero (0). In other embodiments, the observation block 206 may employ a camera-image processing combination that records the physical appearance of the testing tubes to determine whether an oil-water separation morphological phase distribution has been achieved for one or more testing tubes. The captured image may be manually observed by an operator or may be observed using an algorithm designed to detect the phase separation, such as based on known volumes and desired phase separation locations.

In the observation block 206, testing tubes comprising produced fluid 102 samples that have an HLD value equal to or substantially equal to zero (0) will separate into the oil-water separation morphological phase distribution. For each produced fluid 102 sample in each testing tube identified to separate into the oil-water separation morphological phase distribution, the known components included in the produced fluid 102 sample (e.g., surfactant, oil, water, or salt based on the EACN-determining methods herein) causing the HLD to equal to or substantially equal to zero (0) are output to the surfactant-dosage design block 210. The material type, specific material, and concentration thereof of the known components are input into the surfactant-dosage design block 210, where the parameters of the produced fluid 102 sample may be determined using a modified version of Equations 3 for ionic surfactants, provided as Equation 8, and a modified version of Equation 4 for nonionic surfactants, provided as Equation 9, each below:

$$0 = \ln\left(\frac{S * V * W_p + Sa_{j,i}}{V * W_p + Wa_{j,i}}\right) - k\left(\frac{x * EACN + xa_{j,i} * EACN_{j,i}}{x + xa_{j,i}}\right) + \left(\frac{y * C_c + ya_{j,i} * C_{c_{j,i}}}{y + ya_{j,i}}\right) + \alpha_T(T - 25° \text{ C.})$$  Equation 8

$$0 = b\left(\frac{S * V * W_p + Sa_{j,i}}{V * W_p + Wa_{j,i}}\right) - k\left(\frac{x * EACN + xa_{j,i} * EACN_{j,i}}{x + xa_{j,i}}\right) + \left(\frac{y * C_{cn} + ya_{j,i} * C_{cn_{j,i}}}{y + ya_{j,i}}\right) + c_T(T - 25° \text{ C.}),$$  Equation 9 where V is the sample volume (using any volumetric unit that cancels out in the above equations); $W_p$ is the water volume in the original produced fluid sample (using any volumetric unit that cancels out in the above equations); x is the concentration of the oil molecule in the original produced fluid sample (using any concentration unit that cancels out in the above equations); EACN is the EACN of the oil molecule in the original produced fluid sample (unitless); y is the concentration of surfactant original produced fluid (using any concentration unit that cancels out in the above equations). For the $i^{th}$ selected testing tube from each group of tested samples j, which exhibits the oil-water separation morphological phase distribution, $Sa_{j,i}$ is the added salt amount (where added) (using any concentration unit that cancels out in the above equations); $Wa_{j,i}$ is the added water volume (where added) (using any volumetric unit that cancels out in the above equations); $xa_{j,i}$ is the added oil molecule volume (where added) (using any volumetric unit that cancels out in the above equations); $EACN_{j,i}$ is the EACN of the added oil molecule (unitless); $ya_{3,i}$ is the added surfactant volume (where added) (using any volumetric unit that cancels out in the above equations); $C_{c_{j,i}}$ is the characteristic curvature of the added surfactant where the surfactant is ionic (unitless); and $C_{cn_{j,i}}$ is the characteristic curvature of the added surfactant where the surfactant is nonionic (unitless). The remaining variables have been previously defined above.

Equations 8 and 9 are linear functions with six unknown parameters from the original produced fluid: salinity, S; water volume, $W_p$; oil concentration x; EACN; surfactant concentration y; and surfactant characteristic curvature, $C_c$ or $C_{cn}$. Based on the analysis performed in the parameter identification block for the original produced fluid and the point at which the oil-water separation morphological phase distribution is achieved, the unknown parameters in Equations 8 and 9 may be calculated. Produced fluid samples drawn from different locations in the formation, at different times, redundant sample types (e.g., the series samples discussed previously), and the like, may be additionally tested to reduce estimation uncertainty of the unknown parameters using the parameter identification block 208 methods described herein.

After identification of each of the applicable unknown parameters from Equations 8 or 9 in the surfactant-dosage design block 210, identification of a known surfactant, or mixture of surfactants, and concentration thereof may be automatically calculated to reach an HLD value=0 using Equations 3 or 4, described herein, thereby ensuring that the bulk produced fluid (e.g., in a storage container) will achieve oil-water separation morphological phase distribution to facilitate separation of the oil and water from the produced fluids, which may be termed "separating surfactant(s)" herein. As previously described, the type of surfactant(s), dosage, and the like to achieve the oil-water morphological phase distribution may be optimized based on cost, availability, environmental concerns, efficiency, and the like, without departing from the scope of the present disclosure.

A sample of the produced fluid 202, such as one that has been in the holding block 204, may then be tested for quality assurance in a second observation block 212 to ensure that the correct separating surfactant type(s) and concentration(s) was selected to achieve the oil-water separation morphological phase distribution. The second observation block 204 may be substantially similar or identical to the observation block 206, including the means of observation of the phase morphology. Moreover, although a second observation block 212 is shown in FIG. 2, it will be appreciated that the first observation block 206 may be employed at this step in the flow process of the ADS, without departing from the scope of the present disclosure. If the determined separating surfactant(s) and concentration(s) thereof fails to achieve the oil-water separation morphological phase distribution, the ADS look is re-triggered, either with fresh produced fluid 302 samples or those that have been in the holding block 204, beginning at the parameter identification block 208. In this manner, quality control is achieved.

If the determined separating surfactant(s) and concentration(s) thereof are found to produce the oil-water separation morphological phase distribution in the second observation block 210, auto-dosing of bulk produced fluid in a storage container 216 produced from a formation may be determined and performed using the auto-dosing block 214. The auto-dosing block 214 determines the rate and amount of the identified separating surfactant(s) to include in the produced fluid in the storage container 216 to achieve the oil-water separation morphological phase distribution therein based on the flow rate (and, thus volume) of the produced fluid entering the storage container 216 from a formation, as discussed in detail with reference to FIG. 4. Auto-dosing may be achieved by adding the amount and type of separating surfactant(s) directly into the storage container 216, directly into a flow line entering the storage container 216, and the like.

The ADS of the present disclosure is capable of iteratively taking produced fluid samples and continually analyzing and adjusting the amount and type of separating surfactant(s) to include in the storage container 216, which may vary with time, location in the formation, and the like, as discussed previously. Accordingly, the ADS self-adapts to take into account such changes to be implemented using the auto-dosing block 214. The iterative process may be automatic or manual, where an observer observes that the produced fluid either in the first or second observation block 206 or 210, or in the storage container 216 observes that the fluid is no longer exhibiting desired oil-water separation morphological phase distribution and thus begins sampling again.

Figure 4:
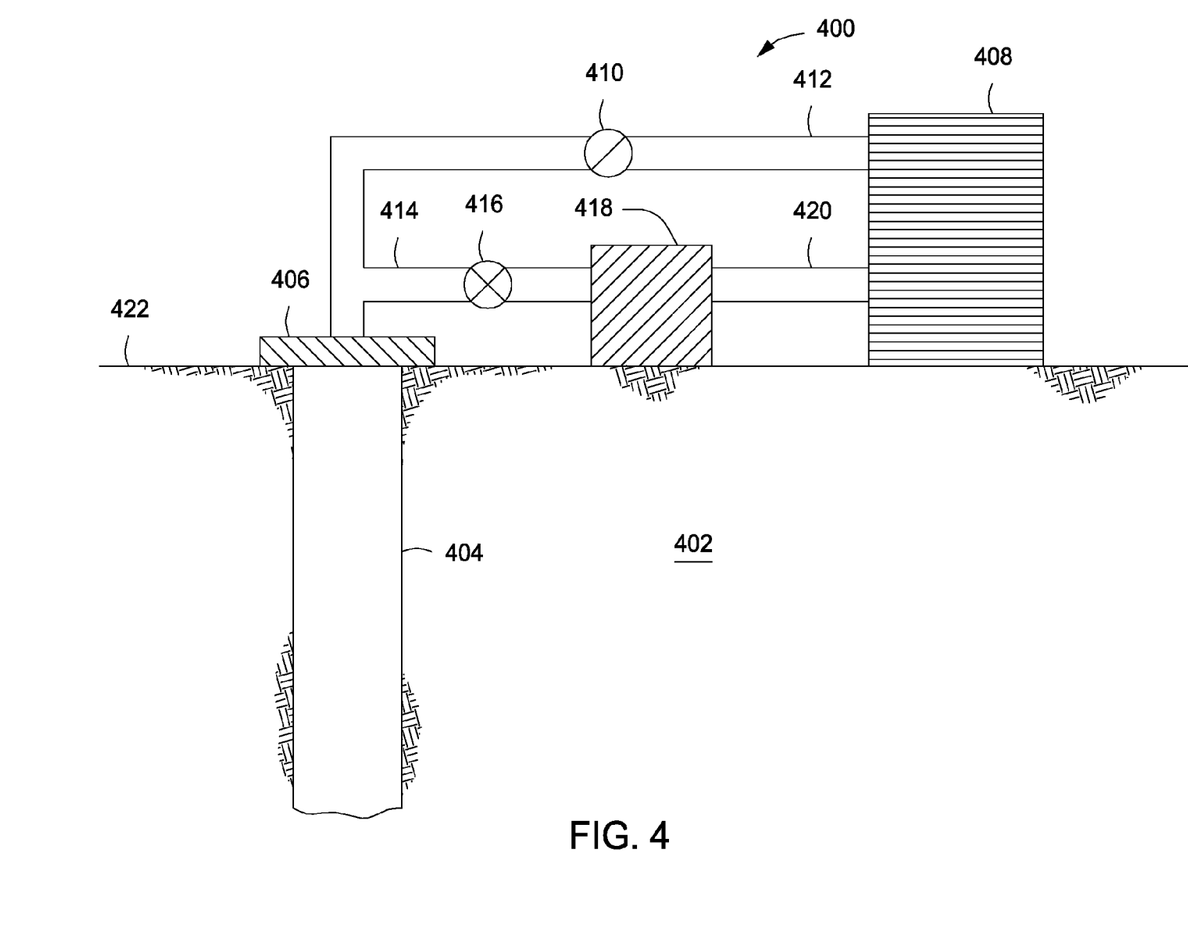
FIG. 4 provides an illustration of a production system suitable for use in conjunction with the methods described herein.

Referring now to FIG. 4, illustrated is a production system 400 for producing fluids from a subterranean formation 402. The production system 400 includes a wellbore 404 penetrating the subterranean formation 402 with a wellhead 406 where the fluid exits the wellbore 404 (which may be cased or uncased) to the surface 422. The produced fluid may then be conveyed to a storage container 408 (e.g., a tank or a tanker truck) or a pipeline (not illustrated) via a main tubular 412 with a pump 410 (if needed). As illustrated, the produced fluids from the subterranean formation 402 may be sampled using a sampling tubular 414 (e.g., a tube, a hose, and the like). The sampling tubular 414 may be in fluid communication with the main tubular 412 and a valve 416 may be arranged on the sampling tubular 416 to have an open or closed position. When the valve 416 is in the open position, produced fluid may flow through the sampling tubular 416 and into the ADS 418, described herein. In some embodiments, the ADS may be, as shown, encompassed in a housing which may be of any size, including a size sufficient to allow operators to enter therein, which comprises the flow process block components described herein.

Auto-dosing of the produced fluids in the storage container 408 may be performed using the auto-dosing block process described herein where separating surfactant(s) are introduced into the storage container 408 through auto-dosing tube 420. Although the auto-dosing is shown as being performed using an auto-dosing tube 420, it will be appreciated that other means of auto-dosing the produced fluids in the storage container 408 may also be achieved without departing from the scope of the present disclosure including, but not limited to, use of a tubular located at the top or at an opening in the storage container 408, dosing from a separate instrument electrically coupled to the ADS to receive the amount and type of surfactant(s) needed, manual dosing in combination with auto-dosing, and the like.

The ADS of the present disclosure may employ automatic methods using a variety of devices, such as computer-controlled algorithms for performing calculations and controlling equipment used to effectuate the ADS. For example, each of the flow process blocks in FIG. 2 may be automated using computer-controlled algorithms. It is recognized that the various embodiments herein directed to computer control, including various process flow blocks, equipment, components, methods, and algorithms, can be implemented using computer hardware, software, combinations thereof, and the like. To illustrate this interchangeability of hardware and software, various illustrative blocks, equipment, components, methods, and algorithms have been described generally in terms of their functionality. Whether such functionality is implemented as hardware or software will depend upon the particular application and any imposed design constraints. For at least this reason, it is to be recognized that one of ordinary skill in the art can implement the described functionality in a variety of ways for a particular application.

Computer hardware used to implement the various illustrative flow process blocks described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMs, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM, and flash EPROM.

It should also be noted that the various drawings provided herein are not necessarily drawn to scale nor are they, strictly speaking, depicted as optically correct as understood by those skilled in optics. Instead, the drawings are merely illustrative in nature and used generally herein in order to supplement understanding of the systems and methods provided herein. Indeed, while the drawings may not be optically accurate, the conceptual interpretations depicted therein accurately reflect the exemplary nature of the various embodiments disclosed.

Embodiments herein include:

Embodiment A

A method comprising: producing a bulk fluid from a subterranean formation, the bulk fluid comprising at least water and a hydrocarbon, and having constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) or nonionic surfactant characteristic curvature ($C_{cn}$); sampling the bulk fluid produced from the subterranean formation, thereby forming at least one sampled fluid; manipulating the sampled fluid by adding at least one of a known component selected from the group consisting of added surfactant, added hydrocarbon, added salt, added water, and any combination thereof; determining at least one of the constituent parameters of the manipulated sampled fluid in combination with a surfactant composition based on obtaining a hydrophilic-lipophilic deviation (HLD) substantially equal to 0, according to Equation A for an ionic surfactant composition and Equation B for a nonionic surfactant composition:

$$HLD = \ln(S) - k^*EACN + c_c - \alpha_T(T - 25° C.) \qquad \text{Equation A}$$

$$HLD = b(S) - k^*EACN + c_{cn} - c_T(T - 25° C.) \qquad \text{Equation B,}$$

where S is salinity of sampled fluid; b is a salinity constant; EACN is equivalent alkane carbon number for the hydrocarbon in the sampled fluid; T is temperature of the sampled fluid; $c_c$ is characteristic curvature for the ionic surfactant composition; $c_{cn}$ is characteristic curvature for the nonionic surfactant composition; $\alpha_T$ is a surfactant temperature constant for the ionic surfactant composition; and $c_T$ is a surfactant temperature constant for the nonionic surfactant composition; determining at least two additional constituent parameters of the sampled fluid, according to Equation C for the ionic surfactant composition and Equation D for the nonionic surfactant composition, where j represents the bulk fluid and i represents the sampled fluid having an HLD substantially equal to 0:

$$0 = \ln\left(\frac{S*V*W_p + Sa_{j,i}}{V*W_p + Wa_{j,i}}\right) - k\left(\frac{x*EACN + xa_{j,i}*EACN_{j,i}}{x + xa_{j,i}}\right) + \left(\frac{y*C_c + ya_{j,i}*C_{c_{j,i}}}{y + ya_{j,i}}\right) + \alpha_T(T - 25° \text{ C.})$$  Equation C $$0 = b\left(\frac{S*V*W_p + Sa_{j,i}}{V*W_p + Wa_{j,i}}\right) - k\left(\frac{x*EACN + xa_{j,i}*EACN_{j,i}}{x + xa_{j,i}}\right) + \left(\frac{y*C_{cn} + ya_{j,i}*C_{cn_{j,i}}}{y + ya_{j,i}}\right) + c_T(T - 25° \text{ C.}),$$  Equation D where V is volume of the sampled fluid; $Sa_{j,i}$ is amount of any added salt; $Wa_{j,i}$ is volume of any added water; $xa_{j,i}$ is volume of any added hydrocarbon; $EACN_{j,i}$ is EACN of any added hydrocarbon; $ya_{3,i}$ is volume of any added surfactant; $C_{c_{j,i}}$ is characteristic curvature of any added surfactant where the surfactant is ionic; and $C_{cn_{j,i}}$ is characteristic curvature of any added surfactant where the surfactant is nonionic; identifying a type and concentration of separating surfactant to include in the bulk fluid where HLD is substantially equal to 0, based on Equation A for the ionic surfactant composition and Equation B for the nonionic surfactant composition; and introducing the identified type and concentration of the separating surfactant into the bulk fluid.

Embodiment A may have one or more of the following additional elements in any combination:

Element A1: Further comprising separating the water and the hydrocarbon in the bulk fluid after the step of introducing the identified type and concentration of the separating surfactant into the bulk fluid.

Element A2: Further comprising automating a step selected from the group consisting of sampling the bulk fluid, manipulating the sampled fluid, determining at least two of the constituent parameters, determining at least one additional constituent parameter, identifying the type and concentration of the separating surfactant, introducing the identified type and concentration of the separating surfactant into the bulk fluid, and any combination thereof.

Element A3: Wherein the step of determining the at least one of the constituent parameters using Equation A or Equation B comprises employing a method selected from the group consisting of a surfactant-surfactant method, a surfactant-oil method, a salinity method, and any combination thereof.

Element A4: Further comprising performing the step of sampling the bulk fluid produced from the subterranean formation iteratively over time.

Element A5: Wherein bulk fluid is retained in a storage container, and wherein the step of introducing the identified type and concentration of the separating surfactant into the bulk fluid comprises introducing the separating surfactant into the storage container.

Element A6: Wherein bulk fluid is retained in a storage container, and wherein the step of introducing the identified type and concentration of the separating surfactant into the bulk fluid comprises introducing the separating surfactant into the storage container, and further comprising separating the water and the hydrocarbon in the bulk fluid from the storage container.

By way of non-limiting example, exemplary combinations applicable to A include: A with A1 and A2; A with A1 and A3; A with A1 and A4; A with A1 and A5; A with A1 and A6; A with A2 and A3; A with A2 and A4; A with A2 and A5; A with A2 and A6; A with A3 and A4; A with A3 and A5; A with A3 and A6; A with A4 and A5; A with A4 and A6; A with A5 and A6; A with A1, A2, A3, A4, A5, and A6; A with A1, A4, and A6; A with A3, A4, and A5; and the like.

Embodiment B

A method comprising: producing a bulk fluid from a subterranean formation, the bulk fluid comprising at least water and a hydrocarbon, and having constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) or nonionic surfactant characteristic curvature ($C_{cn}$); sampling the bulk fluid produced from the subterranean formation, thereby forming at least one sampled fluid; manipulating the sampled fluid by adding at least one of a known component selected from the group consisting of added surfactant, added hydrocarbon, added salt, added water, and any combination thereof; determining at least one of the constituent parameters of the manipulated sampled fluid in combination with a surfactant composition based on obtaining a hydrophilic-lipophilic deviation (HLD) substantially equal to 0, according to Equation A for an ionic surfactant composition and Equation B for a nonionic surfactant composition:

$$HLD=\ln(S)-k*EACN+c_c-\alpha_T(T-25° \text{ C.})$$  Equation A $$HLD=b(S)-k*EACN+c_{cn}-c_T(T-25° \text{ C.})$$  Equation B, where S is salinity of sampled fluid; b is a salinity constant; EACN is equivalent alkane carbon number for the hydrocarbon in the sampled fluid; T is temperature of the sampled fluid; $c_c$ is characteristic curvature for the ionic surfactant composition; $c_{cn}$ is characteristic curvature for the nonionic surfactant composition; $\alpha_T$ is a surfactant temperature constant for the ionic surfactant composition; and $c_T$ is a surfactant temperature constant for the nonionic surfactant composition; determining at least two additional constituent parameter of the sampled fluid, according to Equation C for the ionic surfactant composition and Equation D for the nonionic surfactant composition, where j represents the bulk fluid and i represents the sampled fluid having an HLD substantially equal to 0:

$$0 = \ln\left(\frac{S*V*W_p + Sa_{j,i}}{V*W_p + Wa_{j,i}}\right) - k\left(\frac{x*EACN + xa_{j,i}*EACN_{j,i}}{x + xa_{j,i}}\right) + \left(\frac{y*C_c + ya_{j,i}*C_{c_{j,i}}}{y + ya_{j,i}}\right) + \alpha_T(T - 25° \text{ C.})$$  Equation C $$0 = b\left(\frac{S*V*W_p + Sa_{j,i}}{V*W_p + Wa_{j,i}}\right) - k\left(\frac{x*EACN + xa_{j,i}*EACN_{j,i}}{x + xa_{j,i}}\right) + \left(\frac{y*C_{cn} + ya_{j,i}*C_{cn_{j,i}}}{y + ya_{j,i}}\right) + c_T(T - 25° \text{ C.}),$$  Equation D where V is volume of the sampled fluid; $Sa_{j,i}$ is amount of any added salt; $Wa_{j,i}$ is volume of any added water; $xa_{j,i}$ is volume of any added hydrocarbon; $EACN_{j,i}$ is EACN of any added hydrocarbon; $ya_{3,i}$ is volume of any added surfactant; $C_{c_{j,i}}$ is characteristic curvature of any added surfactant where the surfactant is ionic; and $C_{cn_{j,i}}$ is characteristic curvature of any added surfactant where the surfactant is nonionic; identifying a type and concentration of separating surfactant to include in the bulk fluid where HLD is substantially equal to 0, based on Equation A for ionic surfactant compositions and Equation B for nonionic surfactant compositions; scaling the identified type and concentration of the separating surfactant to a volume of the sampled fluid, introducing the scaled identified type and concentration of the separating surfactant into the sampled fluid, and observing a morphological phase distribution of the sample fluid, wherein an oil-water separation morphological phase distribution is equivalent to the HLD being substantially equal to 0; and introducing the identified type and concentration of the separating surfactant into the bulk fluid.

Embodiment B may have one or more of the following additional elements in any combination:

Element B1: Wherein the steps of scaling the identified type and concentration of the separating surfactant to the volume of the sampled fluid, introducing the scaled identified type and concentration of the separating surfactant into the sampled fluid, and observing a morphological phase distribution of the sample fluid, is performed prior to the step of: introducing the identified type and concentration of the separating surfactant into the bulk fluid.

Element B2: Further comprising repeating the steps of sampling the bulk fluid, manipulating the sampled fluid, determining at least one of the constituent parameters, determining at least one additional constituent parameter, identifying the type and concentration of the separating surfactant, and scaling the identified type and concentration of separating surfactant to the volume of the sampled fluid, if the morphological phase distribution of the sample fluid is not equivalent to the HLD being substantially 0.

Element B3: Further comprising repeating the steps of manipulating the sampled fluid, determining at least one of the constituent parameters, determining at least one additional constituent parameter, identifying the type and concentration of the separating surfactant, and scaling the identified type and concentration of separating surfactant to the volume of the sampled fluid, if the morphological phase distribution of the sample fluid is not equivalent to the HLD being substantially 0.

Element B4: Further comprising separating the water and the hydrocarbon in the bulk fluid after the step of introducing the identified type and concentration of the separating surfactant into the bulk fluid.

Element B5: Further comprising automating a step selected from the group consisting of sampling the bulk fluid, manipulating the sampled fluid, determining at least one of the constituent parameters, determining at least one additional constituent parameter, identifying the type and concentration of the separating surfactant, introducing the identified type and concentration of the separating surfactant into the bulk fluid, scaling the identified type and concentration of separating surfactant to the volume of the sampled fluid, and any combination thereof.

Element B6: Wherein observing a morphological phase distribution of the sample fluid is automated by means of a still camera, a video camera, a camera-imaging processing combination, a conductivity meter, and any combination thereof.

Element B7: Wherein the step of determining at least one of the constituent parameters comprises employing a method selected from the group consisting of a surfactant-surfactant method, a surfactant-oil method, a salinity method, and any combination thereof.

Element B8: Further comprising performing the step of sampling the bulk fluid produced from the subterranean formation iteratively over time.

Element B9: Wherein the bulk fluid is retained in a storage container, and wherein the step of introducing the identified type and concentration of the separating surfactant into the bulk fluid comprises introducing the separating surfactant into the storage container.

Element B10: Wherein the bulk fluid is retained in a storage container, and wherein the step of introducing the identified type and concentration of the separating surfactant into the bulk fluid comprises introducing the separating surfactant into the storage container, and further comprising separating the water and the hydrocarbon in the bulk fluid from the storage container.

By way of non-limiting example, exemplary combinations applicable to B include: B with B1 and B2; B with B1 and B3; B with B1 and B4; B with B1 and B5; B with B1 and B6; B with B1 and B7; B with B1 and B8; B with B1 and B9; B with B1 and B10; B with B2 and B3; B with B2 and B4; B with B2 and B5; B with B2 and B6; B with B2 and B7; B with B2 and B8; B with B2 and B9; B with B2 and B10; B with B3 and B4; B with B3 and B5; B with B3 and B6; B with B3 and B7; B with B3 and B8; B with B3 and B9; B with B3 and B10; B with B4 and B5; B with B4 and B6; B with B4 and B7; B with B4 and B8; B with B4 and B9; B with B4 and B10; B with B5 and B6; B with B5 and B7; B with B5 and B8; B with B5 and B9; B with B5 and B10; B with B6 and B7; B with B6 and B8; B with B6 and B9; B with B6 and B10; B with B7 and B8; B with B7 and B9; B with B7 and B10; B with B8 and B9; B with B8 and B10; B with B9 and B10; B with B1, B2, B3, B4, B5, B6, B7, B8, B9, and B10; B with B1, B2, B3, B4, B5, and B6; B with B1, B4, and B6; B with B3, B4, and B5; and the like.

Embodiment C

A system comprising: a main tubular coupled to a pump and extending from a surface into a subterranean formation, wherein produced bulk fluid is pumped to the surface from the subterranean formation, and wherein the bulk fluid comprises at least water and a hydrocarbon, and has constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) or nonionic surfactant characteristic curvature ($C_{cn}$); a storage container for retaining the bulk fluid; a sampling tubular in fluid communication with the main tubular for sampling the bulk fluid produced from the subterranean formation, thereby forming at least one sampled fluid; and a dosing system coupled to the sampling tubular and configured to receive the at least one sampled fluid, the dosing system configured to determine at least one constituent parameter of the sampled fluid, identify a type and concentration of separating surfactant to include in the bulk fluid to obtain a hydrophilic-lipophilic deviation (HLD) substantially equal to 0, and introduce the identified type and concentration of the separating surfactant into the storage container retaining the bulk fluid.

Embodiment B may have one or more of the following additional elements in any combination:

Element C1: Wherein the dosing system is automated.

Element C2: Wherein the dosing system is automated by means of a still camera, a video camera, a camera-imaging processing combination, a conductivity meter, and any combination thereof.

Element C3: Wherein the dosing system is configured to determine at least one constituent parameter of the sampled fluid by employing a method selected from the group consisting of a surfactant-surfactant method, a surfactant-oil method, a salinity method, and any combination thereof.

By way of non-limiting example, exemplary combinations applicable to C include: C with C1 and C2; C with C1 and C3; C with C2 and C3; C with C1, C2, and C3; and the like.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
producing a bulk fluid from a subterranean formation, the bulk fluid comprising at least water and a hydrocarbon, and having constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) and nonionic surfactant characteristic curvature ($C_{cn}$);
sampling the bulk fluid produced from the subterranean formation, thereby forming at least one sampled fluid;
manipulating the sampled fluid by adding at least one of a known component selected from the group consisting of added surfactant, added hydrocarbon, added salt, added water, and any combination thereof;
determining at least one of the constituent parameters of the manipulated sampled fluid in combination with a surfactant composition based on obtaining a hydrophilic-lipophilic deviation (HLD) substantially equal to 0;
determining at least two additional constituent parameters of the sampled fluid, the parameters being selected from the group comprising V (volume of the sampled fluid); $Sa_{j,i}$ (amount of any added salt); $Wa_{j,i}$ (volume of any added water); $xa_{j,i}$ (volume of any added hydrocarbon); $EACN_{j,i}$ (EACN of any added hydrocarbon); $ya_{3,i}$ (volume of any added surfactant); $C_{c_{j,i}}$ (characteristic curvature of any added surfactant where the surfactant is ionic); and $C_{cn_{j,i}}$ (characteristic curvature of any added surfactant where the surfactant is nonionic);
identifying a type and concentration of separating surfactant to include in the bulk fluid where HLD is substantially equal to 0; and
introducing the identified type and concentration of the separating surfactant into the bulk fluid.

2. The method of claim 1, wherein the step of determining at least one of the constituent parameters of the manipulated sample fluid in combination with a surfactant composition based on obtaining a hydrophilic-lipophilic deviation (HLD) substantially equal to 0 is determined according to Equation A for an ionic surfactant composition and Equation B for a nonionic surfactant composition:

$$HLD = \ln(S) - k^*EACN + c_c - \alpha_T(T - 25°\ C.) \quad \text{Equation A}$$

$$HLD = b(S) - k^*EACN + c_{cn} - c_T(T - 25°\ C.) \quad \text{Equation B,}$$

where S is salinity of sampled fluid; b is a salinity constant; EACN is equivalent alkane carbon number for the hydrocarbon in the sampled fluid; T is temperature of the sampled fluid; $c_c$ is characteristic curvature for the ionic surfactant composition; $c_{cn}$ is characteristic curvature for the nonionic surfactant composition; $\alpha_T$ is a surfactant temperature constant for the ionic surfactant composition; and $c_T$ is a surfactant temperature constant for the nonionic surfactant composition;

the step of determining at least two additional constituent parameters of the sampled fluid is determined according to Equation C for the ionic surfactant composition and Equation D for the nonionic surfactant composition, where j represents the bulk fluid and i represents the sampled fluid having an HLD substantially equal to 0:

$$0 = \ln\left(\frac{S * V * W_p + Sa_{j,i}}{V * W_p + Wa_{j,i}}\right) - k\left(\frac{x * EACN + xa_{j,i} * EACN_{j,i}}{x + xa_{j,i}}\right) + \left(\frac{y * C_c + ya_{j,i} * C_{c_{j,i}}}{y + ya_{j,i}}\right) + \alpha_T(T - 25°\ C.) \quad \text{Equation C}$$

$$0 = b\left(\frac{S * V * W_p + Sa_{j,i}}{V * W_p + Wa_{j,i}}\right) - k\left(\frac{x * EACN + xa_{j,i} * EACN_{j,i}}{x + xa_{j,i}}\right) + \left(\frac{y * C_{cn} + ya_{j,i} * C_{cn_{j,i}}}{y + ya_{j,i}}\right) + c_T(T - 25°\ C.); \quad \text{Equation D}$$

and the step of identifying a type and concentration of separating surfactant to include in the bulk fluid where HLD is substantially equal to 0 is based on Equation A for the ionic surfactant composition and Equation B for the nonionic surfactant composition.

3. The method of claim 1, further comprising separating the water and the hydrocarbon in the bulk fluid after the step of introducing the identified type and concentration of the separating surfactant into the bulk fluid.

4. The method of claim 1, further comprising automating a step selected from the group consisting of sampling the bulk fluid, manipulating the sampled fluid, determining at least one of the constituent parameters, determining at least two additional constituent parameters, identifying the type and concentration of the separating surfactant, introducing the identified type and concentration of the separating surfactant into the bulk fluid, and any combination thereof.

5. The method of claim 1, wherein the step of determining the at least one of the constituent parameters comprises employing a method selected from the group consisting of a surfactant-surfactant method, a surfactant-oil method, a salinity method, and any combination thereof.

6. The method of claim 1, further comprising performing the step of sampling the bulk fluid produced from the subterranean formation iteratively over time.

7. The method of claim 1, wherein bulk fluid is retained in a storage container, and wherein the step of introducing the identified type and concentration of the separating surfactant into the bulk fluid comprises introducing the separating surfactant into the storage container.

8. The method of claim 7, further comprising separating the water and the hydrocarbon in the bulk fluid from the storage container.

9. A method comprising:
producing a bulk fluid from a subterranean formation, the bulk fluid comprising at least water and a hydrocarbon, and having constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) and nonionic surfactant characteristic curvature ($C_{cn}$);
sampling the bulk fluid produced from the subterranean formation, thereby forming at least one sampled fluid;
manipulating the sampled fluid by adding at least one of a known component selected from the group consisting of added surfactant, added hydrocarbon, added salt, added water, and any combination thereof;
determining at least one of the constituent parameters of the manipulated sampled fluid in combination with a surfactant composition based on obtaining a hydrophilic-lipophilic deviation (HLD) substantially equal to 0;
determining at least two additional constituent parameters of the sampled fluid, the parameters being selected from the group comprising V (volume of the sampled fluid); $Sa_{j,i}$ (amount of any added salt); $Wa_{j,i}$ (volume of any added water); $xa_{j,i}$ (volume of any added hydrocarbon); $EACN_{j,i}$ (EACN of any added hydrocarbon); $ya_{3,i}$ (volume of any added surfactant); $C_{c_{j,i}}$ (characteristic curvature of any added surfactant where the surfactant is ionic); and $C_{cn_{j,i}}$ (characteristic curvature of any added surfactant where the surfactant is nonionic);
identifying a type and concentration of separating surfactant to include in the bulk fluid where HLD is substantially equal to 0;
scaling the identified type and concentration of the separating surfactant to a volume of the sampled fluid, introducing the scaled identified type and concentration of the separating surfactant into the sampled fluid, and observing a morphological phase distribution of the sample fluid, wherein an oil-water separation morphological phase distribution is equivalent to the HLD being substantially equal to 0; and
introducing the identified type and concentration of the separating surfactant into the bulk fluid.

10. The method of claim 9, wherein the step of determining at least one of the constituent parameters of the manipulated sample fluid in combination with a surfactant composition based on obtaining a hydrophilic-lipophilic deviation (HLD) substantially equal to 0 is determined according to Equation A for an ionic surfactant composition and Equation B for a nonionic surfactant composition:

$$HLD = \ln(S) - k*EACN + c_c - \alpha_T(T - 25° C.) \quad \text{Equation A}$$

$$HLD = b(S) - k*EACN + c_{cn} - c_T(T - 25° C.) \quad \text{Equation B,}$$

where S is salinity of sampled fluid; b is a salinity constant; EACN is equivalent alkane carbon number for the hydrocarbon in the sampled fluid; T is temperature of the sampled fluid; $c_c$ is characteristic curvature for the ionic surfactant composition; $c_{cn}$ is characteristic curvature for the nonionic surfactant composition; $\alpha_T$ is a surfactant temperature constant for the ionic surfactant composition; and $c_T$ is a surfactant temperature constant for the nonionic surfactant composition;

the step of determining at least two additional constituent parameters of the sampled fluid is determined according to Equation C for the ionic surfactant composition and Equation D for the nonionic surfactant composition, where j represents the bulk fluid and i represents the sampled fluid having an HLD substantially equal to 0:

$$0 = \ln\left(\frac{S*V*W_p + Sa_{j,i}}{V*W_p + Wa_{j,i}}\right) - k\left(\frac{x*EACN + xa_{j,i}*EACN_{j,i}}{x + xa_{j,i}}\right) + \left(\frac{y*C_c + ya_{j,i}*C_{c_{j,i}}}{y + ya_{j,i}}\right) + \alpha_T(T - 25° C.) \quad \text{Equation C}$$

$$0 = b\left(\frac{S*V*W_p + Sa_{j,i}}{V*W_p + Wa_{j,i}}\right) - k\left(\frac{x*EACN + xa_{j,i}*EACN_{j,i}}{x + xa_{j,i}}\right) + \left(\frac{y*C_{cn} + ya_{j,i}*C_{cn_{j,i}}}{y + ya_{j,i}}\right) + c_T(T - 25° C.); \quad \text{Equation D}$$

and
the step of identifying a type and concentration of separating surfactant to include in the bulk fluid where HLD is substantially equal to 0 is based on Equation A for the ionic surfactant composition and Equation B for the nonionic surfactant composition.

11. The method of claim 9, wherein the steps of scaling the identified type and concentration of the separating surfactant to the volume of the sampled fluid, introducing the scaled identified type and concentration of the separating surfactant into the sampled fluid, and observing a morphological phase distribution of the sample fluid, is performed prior to the step of: introducing the identified type and concentration of the separating surfactant into the bulk fluid.

12. The method of claim 9, further comprising repeating the steps of sampling the bulk fluid, manipulating the sampled fluid, determining at least one of the constituent parameters, determining at least two additional constituent parameters, identifying the type and concentration of the separating surfactant, and scaling the identified type and concentration of separating surfactant to the volume of the sampled fluid, if the morphological phase distribution of the sample fluid is not equivalent to the HLD being substantially 0.

13. The method of claim 9, further comprising repeating the steps of manipulating the sampled fluid, determining at least one of the constituent parameters, determining at least two additional constituent parameters, identifying the type and concentration of the separating surfactant, and scaling the identified type and concentration of separating surfactant to the volume of the sampled fluid, if the morphological phase distribution of the sample fluid is not equivalent to the HLD being substantially 0.

14. The method of claim 9, further comprising separating the water and the hydrocarbon in the bulk fluid after the step of introducing the identified type and concentration of the separating surfactant into the bulk fluid.

15. The method of claim 9, further comprising automating a step selected from the group consisting of sampling the bulk fluid, manipulating the sampled fluid, determining at least one of the constituent parameters, determining at least two additional constituent parameters, identifying the type and concentration of the separating surfactant, introducing the identified type and concentration of the separating surfactant into the bulk fluid, scaling the identified type and concentration of separating surfactant to the volume of the sampled fluid, and any combination thereof.

16. The method of claim 9, wherein observing a morphological phase distribution of the sample fluid is automated by means of a still camera, a video camera, a camera-imaging processing combination, a conductivity meter, and any combination thereof.

17. The method of claim 9, wherein the step of determining at least one of the constituent parameters comprises employing a method selected from the group consisting of a surfactant-surfactant method, a surfactant-oil method, a salinity method, and any combination thereof.

18. The method of claim 9, further comprising performing the step of sampling the bulk fluid produced from the subterranean formation iteratively over time.

19. The method of claim 9, wherein the bulk fluid is retained in a storage container, and wherein the step of introducing the identified type and concentration of the separating surfactant into the bulk fluid comprises introducing the separating surfactant into the storage container.

20. The method of claim 19, further comprising separating the water and the hydrocarbon in the bulk fluid from the storage container.

21. A system comprising:
a main tubular coupled to a pump and extending from a surface into a subterranean formation,
wherein produced bulk fluid is pumped to the surface from the subterranean formation, and
wherein the bulk fluid comprises at least water and a hydrocarbon, and has constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) and nonionic surfactant characteristic curvature ($C_{cn}$);
a storage container for retaining the bulk fluid;
a sampling tubular in fluid communication with the main tubular for sampling the bulk fluid produced from the subterranean formation, thereby forming at least one sampled fluid; and
a dosing system coupled to the sampling tubular and configured to receive the at least one sampled fluid, the dosing system configured to determine at least one constituent parameter of the sampled fluid, identify a type and concentration of separating surfactant to include in the bulk fluid to obtain a hydrophilic-lipophilic deviation (HLD) substantially equal to 0, and introduce the identified type and concentration of the separating surfactant into the storage container retaining the bulk fluid.

22. The system of claim 21, wherein the dosing system is automated.

* * * * *